(12) United States Patent
Whinnett et al.

(10) Patent No.: US 9,107,136 B2
(45) Date of Patent: Aug. 11, 2015

(54) FEMTOCELL ACCESS CONTROL

(71) Applicant: Intel Corporation, Santa Clara, CA (US)

(72) Inventors: Nick Whinnett, Barnfield (GB); Fiona Somerville, Bristol (GB)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/768,991

(22) Filed: Feb. 15, 2013

(65) Prior Publication Data

US 2013/0231118 A1   Sep. 5, 2013

Related U.S. Application Data

(63) Continuation of application No. PCT/GB2011/051537, filed on Aug. 15, 2011.

(30) Foreign Application Priority Data

Aug. 16, 2010   (GB) .................................. 1013702.4

(51) Int. Cl.
*H04W 36/00*   (2009.01)
*H04W 36/30*   (2009.01)
(Continued)

(52) U.S. Cl.
CPC .............. *H04W 36/30* (2013.01); *H04W 36/22* (2013.01); *H04W 48/02* (2013.01); *H04W 84/045* (2013.01)

(58) Field of Classification Search
CPC ..... H04W 36/22; H04W 36/30; H04W 48/02; H04W 84/045; H04W 52/242; H04W 52/244; H04W 72/082; Y02B 60/50
USPC ...................... 444/444, 452.1, 452.2; 370/241
See application file for complete search history.

(56) References Cited

U.S. PATENT DOCUMENTS

| 4,380,046 A | 4/1983 | Frosch et al. |
| 4,574,345 A | 3/1986 | Konesky |

(Continued)

FOREIGN PATENT DOCUMENTS

| CN | 101754351 | 6/2010 |
| CN | 101873688 | 10/2010 |

(Continued)

OTHER PUBLICATIONS

"Details on specification aspects for UL ICIC", Qualcomm Europe, May 5-May 9, 2008, 2 pages.

(Continued)

*Primary Examiner* — Kashif Siddiqui
*Assistant Examiner* — Mong-Thuy Tran
(74) *Attorney, Agent, or Firm* — Schiff Hardin LLP

(57) ABSTRACT

Methods and apparatus for controlling access of a mobile device to a femtocell base station in a communications network are described. The method determines whether to allow access of the mobile device to the femtocell base station based on the femtocell-mobile device path loss for transmissions between the mobile device and the femtocell base station. Access may be allowed if the femtocell-mobile device pathloss is lower than a threshold amount. Additionally or alternatively access may be allowed only if the femtocell-mobile device pathloss is lower than the macrocell-mobile device pathloss for transmissions between the mobile device and a macrocell base station. The method is particularly applicable for hybrid access mode femtocells and additional conditions may be applied regarding the number of mobile device that are not part of the subscriber group that can access the femtocell. The method may be implemented by the femtocell, the macrocell or by any other suitable network device.

27 Claims, 10 Drawing Sheets

(51) Int. Cl.
  *H04W 36/22* (2009.01)
  *H04W 48/02* (2009.01)
  *H04W 84/04* (2009.01)

(56) References Cited

U.S. PATENT DOCUMENTS

| | | |
|---|---|---|
| 4,589,066 A | 5/1986 | Lam et al. |
| 4,601,031 A | 7/1986 | Walker et al. |
| 4,603,404 A | 7/1986 | Yamauchi et al. |
| 4,622,632 A | 11/1986 | Tanimoto et al. |
| 4,698,746 A | 10/1987 | Goldstein |
| 4,720,780 A | 1/1988 | Dolecek |
| 4,736,291 A | 4/1988 | Jennings et al. |
| 4,814,970 A | 3/1989 | Barbagelata et al. |
| 4,825,359 A | 4/1989 | Ohkami et al. |
| 4,858,233 A | 8/1989 | Dyson et al. |
| 4,890,279 A | 12/1989 | Lubarsky |
| 4,914,653 A | 4/1990 | Bishop et al. |
| 4,937,741 A | 6/1990 | Harper et al. |
| 4,943,912 A | 7/1990 | Aoyama et al. |
| 4,967,326 A | 10/1990 | May |
| 4,974,146 A | 11/1990 | Works et al. |
| 4,974,190 A | 11/1990 | Curtis |
| 4,992,933 A | 2/1991 | Taylor |
| 5,036,453 A | 7/1991 | Renner et al. |
| 5,038,386 A | 8/1991 | Li |
| 5,065,308 A | 11/1991 | Evans |
| 5,109,329 A | 4/1992 | Strelioff |
| 5,152,000 A | 9/1992 | Hillis |
| 5,193,175 A | 3/1993 | Cutts et al. |
| 5,233,615 A | 8/1993 | Goetz |
| 5,239,641 A | 8/1993 | Horst |
| 5,241,491 A | 8/1993 | Carlstedt |
| 5,247,694 A | 9/1993 | Dahl |
| 5,253,308 A | 10/1993 | Johnson |
| 5,265,207 A | 11/1993 | Zak et al. |
| 5,280,584 A | 1/1994 | Caesar et al. |
| 5,384,697 A | 1/1995 | Pascucci |
| 5,386,495 A | 1/1995 | Wong et al. |
| 5,408,676 A | 4/1995 | Mori |
| 5,410,723 A | 4/1995 | Schmidt et al. |
| 5,410,727 A | 4/1995 | Jaffe et al. |
| 5,473,731 A | 12/1995 | Seligson |
| 5,555,548 A | 9/1996 | Iwai et al. |
| 5,557,751 A | 9/1996 | Banman et al. |
| 5,570,045 A | 10/1996 | Erdal et al. |
| 5,600,784 A | 2/1997 | Bissett et al. |
| 5,692,139 A | 11/1997 | Slavenburg |
| 5,719,445 A | 2/1998 | McClure |
| 5,734,921 A | 3/1998 | Dapp et al. |
| 5,752,067 A | 5/1998 | Wilkinson et al. |
| 5,761,514 A | 6/1998 | Aizikowits et al. |
| 5,790,879 A | 8/1998 | Wu |
| 5,795,797 A | 8/1998 | Chester et al. |
| 5,796,937 A | 8/1998 | Kizuka |
| 5,802,561 A | 9/1998 | Fava et al. |
| 5,805,839 A | 9/1998 | Singahl |
| 5,826,033 A | 10/1998 | Hayashi et al. |
| 5,826,049 A | 10/1998 | Ogata et al. |
| 5,826,054 A | 10/1998 | Jacobs et al. |
| 5,845,060 A | 12/1998 | Vrba et al. |
| 5,860,008 A | 1/1999 | Bradley |
| 5,861,761 A | 1/1999 | Kean |
| 5,864,706 A | 1/1999 | Kurokawa et al. |
| 5,923,615 A | 7/1999 | Leach et al. |
| 5,926,640 A | 7/1999 | Mason et al. |
| 5,946,484 A | 8/1999 | Brandes |
| 5,951,664 A | 9/1999 | Lambrecht et al. |
| 5,959,995 A | 9/1999 | Wicki et al. |
| 5,963,609 A | 10/1999 | Huang |
| 6,023,757 A | 2/2000 | Nishimoto et al. |
| 6,044,451 A | 3/2000 | Slavenburg |
| 6,052,752 A | 4/2000 | Kwon |
| 6,055,285 A | 4/2000 | Alston |
| 6,069,490 A | 5/2000 | Ochotta et al. |
| 6,101,599 A | 8/2000 | Wright et al. |
| 6,122,677 A | 9/2000 | Porterfield |
| 6,167,502 A | 12/2000 | Pechanek et al. |
| 6,173,386 B1 | 1/2001 | Key et al. |
| 6,175,665 B1 | 1/2001 | Sawada |
| 6,199,093 B1 | 3/2001 | Yokoya |
| 6,317,820 B1 | 11/2001 | Shiell et al. |
| 6,345,046 B1 | 2/2002 | Tanaka |
| 6,360,259 B1 | 3/2002 | Bradley |
| 6,381,293 B1 | 4/2002 | Lee et al. |
| 6,381,461 B1 | 4/2002 | Besson et al. |
| 6,393,026 B1 | 5/2002 | Irwin |
| 6,408,402 B1 | 6/2002 | Norman |
| 6,424,870 B1 | 7/2002 | Maeda et al. |
| 6,448,910 B1 | 9/2002 | Lu |
| 6,499,096 B1 | 12/2002 | Suzuki |
| 6,499,097 B2 | 12/2002 | Tremblay et al. |
| 6,567,417 B2 | 5/2003 | Kalkunte et al. |
| 6,615,339 B1 | 9/2003 | Ito et al. |
| 6,631,439 B2 | 10/2003 | Saulsbury et al. |
| 6,681,341 B1 | 1/2004 | Fredenburg et al. |
| 6,775,766 B2 | 8/2004 | Revilla et al. |
| 6,795,422 B2 | 9/2004 | Ohsuge |
| 6,829,296 B1 | 12/2004 | Troulis et al. |
| 6,892,293 B2 | 5/2005 | Sachs et al. |
| 6,928,500 B1 | 8/2005 | Ramanujan et al. |
| 6,952,181 B2 | 10/2005 | Karr et al. |
| 6,961,782 B1 | 11/2005 | Denneau et al. |
| 6,996,157 B2 | 2/2006 | Ohsuge |
| 7,103,008 B2 | 9/2006 | Greenblat et al. |
| 7,161,978 B2 | 1/2007 | Lu et al. |
| 7,237,055 B1 | 6/2007 | Rupp |
| 7,302,552 B2 | 11/2007 | Guffens et al. |
| 7,340,017 B1 | 3/2008 | Banerjee |
| 7,342,414 B2 | 3/2008 | DeHon |
| 7,383,422 B2 | 6/2008 | Kageyama et al. |
| 7,428,721 B2 | 9/2008 | Rohe et al. |
| 7,549,081 B2 | 6/2009 | Robbins et al. |
| 7,672,836 B2 | 3/2010 | Lee et al. |
| 7,712,067 B1 | 5/2010 | Fung et al. |
| 7,801,029 B2 | 9/2010 | Wrenn et al. |
| 7,804,719 B1 | 9/2010 | Chirania et al. |
| 8,032,142 B2 | 10/2011 | Carter et al. |
| 8,219,101 B2* | 7/2012 | Shin ............................ 455/444 |
| 8,243,682 B2* | 8/2012 | Nylander et al. ............ 370/331 |
| 2002/0045433 A1 | 4/2002 | Vihiriala |
| 2002/0069345 A1 | 6/2002 | Mohamed et al. |
| 2002/0174318 A1 | 11/2002 | Stuttard et al. |
| 2002/0198606 A1 | 12/2002 | Satou |
| 2003/0154358 A1 | 8/2003 | Seong |
| 2003/0235241 A1 | 12/2003 | Tamura |
| 2004/0078548 A1 | 4/2004 | Claydon et al. |
| 2004/0083409 A1 | 4/2004 | Rozenblit et al. |
| 2004/0139466 A1 | 7/2004 | Sharma et al. |
| 2004/0150422 A1 | 8/2004 | Wong et al. |
| 2004/0198386 A1 | 10/2004 | Dupray |
| 2005/0083840 A1 | 4/2005 | Wilson |
| 2005/0114565 A1 | 5/2005 | Gonzalez et al. |
| 2005/0124344 A1 | 6/2005 | Laroia et al. |
| 2005/0163248 A1 | 7/2005 | Berangi et al. |
| 2005/0250502 A1 | 11/2005 | Laroia et al. |
| 2005/0282500 A1 | 12/2005 | Wang et al. |
| 2006/0087323 A1 | 4/2006 | Furse et al. |
| 2006/0089154 A1 | 4/2006 | Laroia et al. |
| 2006/0251046 A1 | 11/2006 | Fujiwara |
| 2006/0268962 A1 | 11/2006 | Cairns et al. |
| 2007/0036251 A1 | 2/2007 | Jelonnek et al. |
| 2007/0127556 A1 | 6/2007 | Sato |
| 2007/0173255 A1 | 7/2007 | Tebbit et al. |
| 2007/0183427 A1 | 8/2007 | Nylander et al. |
| 2007/0220522 A1 | 9/2007 | Coene et al. |
| 2007/0220586 A1 | 9/2007 | Salazar |
| 2007/0248191 A1 | 10/2007 | Pettersson |
| 2007/0254620 A1 | 11/2007 | Lindqvist et al. |
| 2007/0263544 A1 | 11/2007 | Yamanaka et al. |
| 2007/0270151 A1 | 11/2007 | Claussen et al. |
| 2008/0146154 A1 | 6/2008 | Claussen et al. |
| 2008/0151832 A1 | 6/2008 | Iwasaki |
| 2009/0003263 A1 | 1/2009 | Foster et al. |

(56) References Cited

U.S. PATENT DOCUMENTS

| | | |
|---|---|---|
| 2009/0042593 A1 | 2/2009 | Yavuz et al. |
| 2009/0042596 A1* | 2/2009 | Yavuz et al. ............... 455/522 |
| 2009/0046665 A1 | 2/2009 | Robson et al. |
| 2009/0080550 A1 | 3/2009 | Kushioka |
| 2009/0092122 A1 | 4/2009 | Czaja et al. |
| 2009/0097452 A1 | 4/2009 | Gogic |
| 2009/0098871 A1 | 4/2009 | Gogic |
| 2009/0111503 A1 | 4/2009 | Pedersen et al. |
| 2009/0150420 A1 | 6/2009 | Towner |
| 2009/0163216 A1 | 6/2009 | Hoang et al. |
| 2009/0168907 A1 | 7/2009 | Mohanty et al. |
| 2009/0196253 A1 | 8/2009 | Semper |
| 2009/0215390 A1 | 8/2009 | Ku et al. |
| 2009/0252200 A1 | 10/2009 | Dohler et al. |
| 2009/0264077 A1 | 10/2009 | Damnjanovic |
| 2009/0296635 A1 | 12/2009 | Hui et al. |
| 2010/0035556 A1 | 2/2010 | Cai et al. |
| 2010/0046455 A1 | 2/2010 | Wentink et al. |
| 2010/0054237 A1 | 3/2010 | Han et al. |
| 2010/0067491 A1 | 3/2010 | Park et al. |
| 2010/0087148 A1 | 4/2010 | Srinivasan et al. |
| 2010/0105345 A1 | 4/2010 | Thampi et al. |
| 2010/0111070 A1 | 5/2010 | Hsu |
| 2010/0157906 A1 | 6/2010 | Yang et al. |
| 2010/0167730 A1 | 7/2010 | Shin |
| 2010/0195525 A1 | 8/2010 | Eerolainen |
| 2010/0203891 A1 | 8/2010 | Nagaraja et al. |
| 2010/0215032 A1 | 8/2010 | Jalloul et al. |
| 2010/0216403 A1 | 8/2010 | Harrang |
| 2010/0216485 A1 | 8/2010 | Hoole |
| 2010/0222068 A1 | 9/2010 | Gaal et al. |
| 2010/0234061 A1 | 9/2010 | Khandekar et al. |
| 2010/0248646 A1 | 9/2010 | Yamazaki et al. |
| 2010/0273481 A1 | 10/2010 | Meshkati et al. |
| 2010/0279689 A1 | 11/2010 | Tinnakornsrisuphap et al. |
| 2011/0002426 A1 | 1/2011 | Muirhead |
| 2011/0122834 A1 | 5/2011 | Walker et al. |
| 2011/0130143 A1 | 6/2011 | Mori et al. |
| 2011/0170494 A1 | 7/2011 | Kim et al. |
| 2011/0182252 A1* | 7/2011 | Liu et al. ............... 370/329 |
| 2011/0218004 A1* | 9/2011 | Catovic et al. ............... 455/509 |
| 2011/0286407 A1* | 11/2011 | Vajapeyam et al. ............ 370/329 |
| 2014/0080488 A1* | 3/2014 | Michel et al. ............... 455/436 |

FOREIGN PATENT DOCUMENTS

| | | |
|---|---|---|
| EP | 0 180 212 A3 | 5/1986 |
| EP | 492174 A3 | 7/1992 |
| EP | 0 877 533 A3 | 11/1998 |
| EP | 0 973 099 | 1/2000 |
| EP | 0 977 355 | 2/2000 |
| EP | 1054523 | 11/2000 |
| EP | 1 134 908 | 9/2001 |
| EP | 1418776 | 5/2004 |
| EP | 1 946 506 | 7/2008 |
| EP | 1876854 | 9/2008 |
| EP | 2 071 738 | 6/2009 |
| EP | 2 160 062 | 3/2010 |
| EP | 2 326 118 | 5/2011 |
| GB | 2 304 495 | 3/1997 |
| GB | 2 370 380 | 6/2002 |
| GB | 2398651 | 8/2004 |
| GB | 2 414 896 | 12/2005 |
| GB | 2391083 | 3/2006 |
| GB | 2 447 439 | 9/2008 |
| GB | 2463074 | 3/2010 |
| JP | 61123968 | 6/1986 |
| JP | A-8-297652 | 11/1996 |
| JP | 11272645 | 10/1999 |
| JP | 2001-034471 | 2/2001 |
| JP | 2004-525439 | 8/2004 |
| JP | 2006-500673 | 1/2006 |
| JP | 2010-147682 | 7/2010 |
| WO | 90/04235 | 4/1990 |
| WO | 91/11770 | 8/1991 |
| WO | 97/26593 | 7/1997 |
| WO | 98/50854 | 11/1998 |
| WO | 01/02960 | 1/2001 |
| WO | 02/50624 | 6/2002 |
| WO | 02/50700 | 6/2002 |
| WO | 03/001697 | 1/2003 |
| WO | 2004/029796 A3 | 4/2004 |
| WO | 2004/034251 | 4/2004 |
| WO | 2004/102989 | 11/2004 |
| WO | 2005/048491 | 5/2005 |
| WO | 2006/059172 | 6/2006 |
| WO | 2007/021139 | 2/2007 |
| WO | 2007/054127 | 5/2007 |
| WO | 2007/056733 | 5/2007 |
| WO | 2007/126351 | 11/2007 |
| WO | 2008/030934 | 3/2008 |
| WO | 2008/090154 | 7/2008 |
| WO | 2008/099340 | 8/2008 |
| WO | 2008/155732 | 12/2008 |
| WO | 2009/054205 | 4/2009 |
| WO | 2009/061585 | 5/2009 |
| WO | 2010/031066 | 3/2010 |
| WO | 2010/072127 | 7/2010 |
| WO | 2010/121199 | 10/2010 |
| WO | 2010/126155 | 11/2010 |

OTHER PUBLICATIONS

3GPP TS 36.331 v9.2.0 3rd Generation Partnership Project: Technical Specification Group Radio Access Network; Evolved Universal Terrestrial Radio Acces (E-UTRA); Radio Resource Control (RRC) Protocol specification (Release 9) Mar. 2010, pp. 1-248.

Alcatel-Lucent, et al., "Congested H(e)NB Hybrid Access Mode cell", 2009, 3GPP Draft; R3-091053-Congested H(e)NB, $3_{rd}$ Generation Partnership Project (3GPP), Apr. 29, 2009, 4 pages.

Motorola, "Text proposal for TR 36.9xx: Reducing HeNB interference by dynamically changing HeNB access mode", 2009, 3GPP Draft: R4-094688, Apr. 29, 2009, 2 pages.

MIPS, MIPS32 Architecture for Programmers, 2001, MIPS Technologies, vol. 2, pp. 1-253.

Pechanek, et al. ManArray Processor Interconnection Network: An Introduction, Euro-Par'99, LNCS 1685, pp. 761-765, 1999.

Waddington, T., Decompilation of "hello world" on Pentium and SPARC, 4 pages, [retrieved on Aug. 3, 2012]. Retrieved from the Internet:<URL: http://web.archive.org/web/20050311141936/http://boomerang.sourceforge.net/helloworld.html>.

Balakrishnan, et al., CodeSurfer/x86 - A Platform for Analyzing x86 Executables, Springer-Verlag Berlin Heidelber, 2005, [retrieved on Dec. 30, 2011], retrieved from the internet:<URL:http://www.springerlink.com/content/uneu2a95u9nvb20v/>.

Miecznikowski, J., et al., "Decompiling Java Using Stage Encapsulation", Proceedings of the Eighth Working Conference on Reverse Engineering, Oct. 2-5, 2001.

Panesar, G. et al., "Deterministic Parallel Processing", Proceedings of the 1st Microgrid Workshop, Jul. 2005.

Towner, D. et al., "Debugging and Verification of Parallel Systems—the picoChip way", 2004.

PicoChip, "PC7203 Development Platform Preliminary Product Brief", Jul. 2007.

Ennals, R. et al., "Task Partitioning for Multi-core Network Processors", 2005.

Rabideau, Daniel J., et al., "Simulated Annealing for Mapping DSP Algorithms on to Multiprocessors," Signals, Systems and Computers, 1993 Conference Record of the Twenty-Seventh Asilomar Conference, Nov. 1-3, 1993, IEEE, pp. 668-672.

Nanda, Ashwini K., et al., "Mapping Applications onto a Cache Coherent Multiprocessor," Conference on High Performance Networking and Computing, Proceedings of the 1992 ACM/IEEE Conference on Supercomputing, 1992, IEEE, pp. 368-377.

Lin, Lian-Yu, et al., Communication-driven Task Binding for Multiprocessor with Latency Insensitive Network-on-Chip, Design Automation Conference, 2005 Proceedings of th ASP-DAC, Jan. 18/21, 2005, IEEE, pp. 39-44.

(56) References Cited

OTHER PUBLICATIONS

Holger Claussen, Bell Laboratories, Alcatel-Lucent; "Performance of Macro and Co-Channel Femtocells in a Hierarchical Cell Structure"; The 18th Annual IEEE Internation Symposium on Personal, Indoor and Mobile Radio Communications (PIMRC'07); Sep. 1, 2007; pp. 1-5, XP031168593, ISBN: 978-1-4244-1143-6; Swindon, United Kingdom.

Shiroshita, T., et al.: "Reliable data distribution middleware for large-scale massive data replication" Parallel and Distributed Information Systems, 1993, Fourth International Conference on Miami Beach, FL, USA Dec. 18-20, 1996, Los Alamitos, CA, USA IEEE Comput. Soc, US, Dec. 18, 1996, pp. 196-205m XP010213188 ISBN: 0-8186-7475-X.

Levine B. N. et al.: "A comparison of known classes of reliable multicast protocols" Netowrk Protocols, 1996 International Conference on Columbus, OH, USA Oct.29-Nov. 1, 1996, Los Alamitos, CA, USA IEEE Comput. Soc. US Oct. 29, 1996, pp. 112-121, XP010204425 ISBN: 0-8186-7453-9.

Ishijima, et al., A Semi-Synchronous Circuit Design Method by Clock Tree Modification IEEE Trans. Fundamentals, vol. E85-A, no. Dec. 12, 2002.

Greenstreet, et al., Implementing a STARI Chip, IEEE 1995.

Hierarchical multiprocessor organizations; J. Archer Harris; David R. Smith; International Symposium on computer Architecture; Proceedings of the 4th annual symposium on Computer architecture pp. 41-48 Year of Publication 1977.

"Hierarchical Interconnection Networks for Multicomputer systems" Sivarama P. Dandamudi, et al. IEEE Transactions on Computers archive vol. 39, Issue 6 (Jun. 1990) pp. 786-797 Year of Publication: 1990.

A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 On pp. 254-264.

Performance Analysis of Multilevel Bus Networks for Hierarchichal Multiprocessors S.M. Mahmud IEEE Transactions on Computers archive vol. 43, Issue 7 (Jul. 1994) pp. 789-805 Year of Publication: 1994.

Performance Analysis of a Generalized Class of M-Level Hierarchical Multiprocessor Systems I.O. Mahgoub A.K. Elmagarmid Mar. 1992 (vol. 3, No. 2) pp. 129-138.

Kober, Rudolf, "The Multiprocessor System SMS 201—Combining 128 Microprocessors to a Powerful Computer," Sep. 1977, Compcon '77, pp. 225-230.

Knight, Thomas and Wu, Henry, "A Method for Skew-free Distribution of Digital Signals using Matched Variable Delay Lines," VLSI Circuits, 1993. Digest of Technicial Papers. 1993 Symposium on, May 1993, pp. 19-21.

Popli, S.P., et al., "A Reconfigurable VLSI Array for Reliability and Yield Enhancement," Proceedings of the International Conference on Systolic Arrays, 1988, pp. 631-642.

John, L.K., et al., "A Dynamically Reconfigurable Interconnect for Array Processors," IEE Transactions on Very Large Scale Integration (lvsi) Systems, vol. 6, No. 1, Mar. 1998, pp. 150-157.

Schmidt, U., et al., "Datawave: A Single-Chip Multiprocessor for Video Applications," IEEE Micro, vol. 11, No. 3, Jun. 1991, pp. 22-25, 88-94.

Chean, M., et al., "A Taxonomy of Reconfiguration Techniques for Fault-Tolerant Processor Arrays," Computer, IEEE Computer Society, vol. 23, No. 1, Jan. 1990, pp. 55-69.

Kamiura, N., et al., "A Repairable and Diagnosable Cellular Array on Multiple-Valued Logic," Proceedings of the 23rd International Symposium on Multiple-Valued Logic, 1993, pp. 92-97.

LaForge, l., "Extremally Fault Tolerant Arrays," Proceedings: International Conference on Wafer Scale Integration, 1989, pp. 365-378.

Reiner Hartenstein, et al., On Reconfigurable Co-Processing Units, Proceedings of Reconfigurable Architectures Workshop (RAW98), Mar. 30, 1998.

Schmidt, U., et al., "Data-Driven Array Processor for Video Signal Processing", IEEE—1990 (USA).

Muhammad Ali Mazidi, "The 80x86 IBM PC and Compatible Computers", 2003, Prentice Hall, 4th edition, pp. 513-515.

Shigei, N., et al., "On Efficient Spare Arrangements and an Algorithm with Relocating Spares for Reconfiguring Processor Arrays," IEICE Transactions on Fundamentals of Electronics, communications and Computer Sciences, vol. E80-A, No. 6, Jun. 1997, pp. 988-995.

"Interference Management in Femto Cell Deployment", Mingxi Fan, Mehmet Yavuz, Sanjiv Nanda, Yeliz Tokgoz, Farhad Meshkati, Raul Dangui, Qualcomm Incorporated, QUALCOMM 3GPP2 Femto Workshop, Boston, MA, Oct. 15, 2007.

\* cited by examiner

FEMTOCELL ACCESS CONTROL

PRIORITY CLAIM

This application is a continuation of and claims priority to and the benefit of PCT Application No. PCT/GB2011/051537 filed on Aug. 15, 2011 which claims priority to and the benefit of Great Britain Application No. 1013702.4 filed on Aug. 16, 2010.

FIELD OF THE INVENTION

The invention relates to femtocells, and in particular relates to performing access control to a femtocell base station, such as a femtocell base station operating in a hybrid access mode.

BACKGROUND TO THE INVENTION

Femtocell base stations in a Long Term Evolution (LTE) communication network (otherwise known as Home evolved Node Bs—HeNBs- or Enterprise evolved Node Bs-EeNBs) are small, low-power, indoor cellular base stations for residential or business use. They provide better network coverage and capacity than that available in such environments from the overlying macrocellular LTE network. In addition, femtocell base stations use a broadband connection to receive data from and send data back to the operator's network (known as "backhaul").

Femtocell base stations can operate in one of three access modes known as "closed", "open" or "hybrid". For femtocell base stations operating in a "closed" access mode, only a limited set of mobile devices (otherwise known as User Equipments—UEs) belonging to the network operator and associated or registered with the femtocell base station are allowed to access the femtocell base station. This set of UEs is called the Closed Subscriber Group (CSG), and would typically consist of family members where the femtocell base station is used in a home environment, or employees where the femtocell base station is used in an enterprise or work environment.

For femtocell base stations operating in an "open" access mode, all UEs belonging to the network operator are allowed to access the femtocell base station. This might be desirable in order to allow other UEs that would otherwise have a poor signal quality, or that would otherwise cause or suffer interference to/from the femtocell base station, to access (i.e. hand-in to) the femtocell base station.

For femtocell base stations operating in a "hybrid" access mode as defined in 3GPP release 9 (for example see 3GPP TS 36.300), all UEs belonging to the network operator are allowed to access (i.e. hand-in to) the femtocell base station as in the "open" mode. However once the UEs access the femtocell base station, priority is given to UEs that are in the CSG set in order to avoid significant degradations in quality of service that might result from the UEs that are not in the CSG set consuming too many resources of the femtocell base station (these resources might include femtocell base station power, bandwidth (in LTE networks) or code resource (in WCDMA networks), and backhaul bandwidth). These non-CSG UEs are referred to as "visiting UEs" herein as they are temporarily making use of the resources of the femtocell base station. The UEs that are making use of the macrocell base station rather than the femtocell base station are referred to as "macro UEs" herein, and the UEs that are part of the Closed Subscriber Group of the femtocell and that are making use of the femtocell base station are referred to as "home UEs".

Conventionally, the decision for performing a handover of a macro UE from a macrocell base station to a femtocell base station (and vice versa, i.e. performing a handover of a home or visiting UE from the femtocell base station to the macrocell base station) is based on the occurrence of one or more of a number of "measurement events", that are indications that a specific event has occurred. These measurement events are used to trigger the sending of measurement reports from a UE to the current serving cell (i.e. the macrocell for a macro UE and femtocell for a home or visiting UE). The measurement events specified in the 3GPP specification include:

Event A1—The signal quality of the serving cell becomes better than a threshold.

Event A2—The signal quality of the serving cell becomes worse than a threshold.

Event A3—The signal quality of a neighbouring cell becomes an offset amount better than the signal quality in the serving cell.

Event A4—The signal quality of a neighbouring cell becomes better than a threshold.

Event A5—The signal quality of the serving cell becomes worse than a first threshold and the signal quality in a neighbouring cell becomes better than a second threshold.

The measurement reports sent from the UE to the current serving cell may include Received Signal Reference Power (RSRP) and Received Signal Reference Quality (RSRQ) measured on both source and target cells. RSRP is a measurement of received power made on the reference signals transmitted in a cell whereas RSRQ is a measure of quality. Both are measurements of the downlink. The decision to access a target cell is typically made based on RSRP such that a decision to handover will only be made if the RSRP on the target cell is better by some threshold. If this threshold equals the threshold used in the measurement event then in effect the measurement event triggers the handover.

It has been noted that the use of femtocell base stations that may be useable by any UE of the network, i.e. use of femtocell base stations operating in the open access node or the hybrid access mode, has the potential to improve the overall performance of the network (over both the macrocell and femtocell layers) as follows:

coverage problems in the macrocell for macro UEs can be alleviated by allowing the macro UEs to access a nearby femtocell;

downlink interference from a nearby femtocell to a macro UE downlink (i.e. interference to transmissions from the macrocell base station to the macro UE from transmissions between the femtocell base station and home or visiting UEs) can be alleviated by allowing the 'victim' macro UE to access the femtocell; and uplink interference from a nearby macro UE to a femtocell (i.e. interference to transmissions between the femtocell base station and home or visiting UEs from transmissions from macro UEs that are within the coverage area of the femtocell base station) can be alleviated by allowing the macro UE to make use of the 'victim' femtocell base station.

However, there are problems with using the conventional handover measurement procedure to decide whether to allow a macro UE to make use of (i.e. hand-in to) a femtocell base station, especially one operating in a hybrid access mode, (and vice versa, i.e. whether a visiting UE should still be allowed to make use of the femtocell base station).

SUMMARY OF THE INVENTION

In particular, it has been found that the optimum decision point for permitting a handover to the femtocell base station may be different for the uplink and the downlink. The differences in the optimum decision point for granting or denying a macro UE access to a femtocell base station can be seen by considering the differences between the link budget between the macro UE and femtocell base station and the macro UE and the macrocell base station, in both the uplink and downlink directions.

For the uplink (i.e. from the macro UE to the femtocell or the macrocell base stations), the loss in transmissions to the femtocell base station will be lower than the loss in transmissions to the macrocell base station (where the loss is the net loss considering pathloss, shadowing and antenna gains, etc.), but the maximum UE transmission power will be the same in both cases.

However, for the downlink (i.e. from the macrocell or femtocell base stations to the macro UE), while the loss due to pathloss, shadowing and antenna gains will be the same as for the uplink, the transmit power of the femtocell base station will be significantly lower than the transmit power of the macrocell base station.

Furthermore, noise and interference levels may be different in the uplink to the femtocell base station and the uplink to the macrocell base station.

Therefore, the relative performance for a macro UE between using the femtocell base station and the macrocell base station are not balanced in the uplink and downlink, and this means the optimum decision point for admitting a macro UE to a femtocell base station is different for uplink and downlink.

Therefore, there is a need for an improved method and network node implementing the same for determining when to allow a macro UE to access a femtocell base station that considers both uplink and downlink performance.

Furthermore, another problem with granting macro UEs access to a hybrid-mode femtocell base station is how to determine the resources available for use at a femtocell base station for the visiting UEs, such that the UEs registered to the Closed Subscriber Group of the femtocell base station (i.e. the home UEs) do not suffer significant degradation to their quality of service (and preferably experience improved performance), while the performance is also improved for macro UEs.

Thus, according to a first aspect of the invention, there is provided a method for controlling access of a mobile device to a femtocell base station comprising determining whether to allow access of the mobile device to the femtocell base station based on the femtocell-mobile device path loss for transmissions between the mobile device and the femtocell base station.

The method therefore uses pathloss considerations to determine when to allow access to a femtocell base station. In one embodiment the method may allow access only if the femtocell-mobile device pathloss is below a threshold value.

In some embodiments determining whether to allow access to the femtocell basestation may further be based on a macrocell-mobile device pathloss for transmissions between the mobile device and a macrocell base station and, for example, access may be allowed only if the femtocell-mobile device pathloss is lower than the macrocell-mobile device path loss and in some instances lower by a threshold amount. The condition that the femtocell-mobile device pathloss is lower than the macrocell-mobile device pathloss may be in addition, or an alternative, to the condition that the femtocell-mobile device pathloss is below a threshold value.

The femtocell base station may operate in hybrid access mode and there may be a preferred group of mobile devices for the femtocell base station.

In a second aspect of the invention there is provided a network device for use in a communications network comprising at least one macrocell base station and at least one femtocell base station, the network device may comprise a processor configured to implement the method described above.

The network device may, for example, comprise the femtocell base station, at least part of a macrocell base station, or a gateway device which forms a gateway to the femtocell base station.

In one embodiment the method further comprising obtaining measurement data of the signal strength of the femtocell base station at the mobile device and assessing the femtocell-mobile device path loss from the measurement data. The determining whether to allow access may comprise allowing access only if the femtocell-mobile device pathloss is below a threshold value. In one variation whether to allow access is further based on a macrocell-mobile device pathloss for transmissions between the mobile device and a macrocell base station. Or, determining whether to allow access comprises allowing access only if the femtocell-mobile device pathloss is lower than the macrocell-mobile device path loss.

In one embodiment determining whether to allow access comprises allowing access only if the femtocell-mobile device pathloss is lower than the macrocell-mobile device path loss by a threshold amount. It is contemplated that the method may further comprise obtaining measurement data of the signal strength of at least one available macrocell base station at the mobile device and assessing the macrocell-mobile device path loss from the measurement data. The method may further comprise allowing access only if at least one additional condition is satisfied.

Also disclosed herein is the method wherein at least one of the one additional condition specifies that access to the femtocell base station for the mobile device is allowed only if the number of mobile devices which are not part of the preferred group of mobile devices that are accessing the femtocell base station is less than a specified limit. The specified limit may vary depending on the number of mobile devices that are part of the preferred group of mobile devices that are accessing the femtocell base station. In one embodiment the at least one of the one additional condition specifies that access to the femtocell base station is allowed only if the femtocell base station has the available capacity or resources to support the mobile device. The method may further comprise, when the mobile device is being served by a macrocell base station and access to the femtocell base station is allowed, initiating handover of the mobile device from the macrocell base station to the femtocell base station.

In one configuration, if access to the femtocell base station is allowed to the mobile device, then determining whether to allow access is repeated to determine whether continued access should be allowed to the mobile device. Likewise, determining whether to allow access is repeated may be repeated at at least one of: periodic intervals; availability of updated pathloss data; and changes in loading conditions of the femtocell base station. Determining whether to allow access may be repeated following access to the femtocell of a mobile device which is part of a preferred group of mobile devices for the femtocell base station. In on variation, if in the event that access of the mobile device to the femtocell base station is denied, then further comprising initiating handover of the mobile device from the femtocell base cell to a macrocell base station.

In one embodiment the overall transmission losses between the femtocell and the mobile device are used as an indication of the femtocell-mobile device path loss. In one embodiment, when access to the femtocell base station is allowed to a mobile device which is not part of a preferred group of mobile devices for the femtocell base station, one or more constraints are applied governing transmission with the mobile device which is not part of the preferred group. The one or more constraints may comprise a restriction on the number of frequency resource blocks that can be used in the uplink from the mobile device which is not part of the preferred group to the femtocell base station. In addition, the one constraint may comprise a power cap on the power of uplink transmission from the mobile device to the femtocell base station.

In one embodiment the power cap for a mobile device which is not part of the preferred group is higher than a power cap for mobile devices which are part of the preferred group. It is also contemplated that the one constraint may be a restriction on an amount of power of the femtocell base station transmissions available for downlink transmissions to mobile devices that are not part of the preferred group. The one constraint may also be a restriction on an amount of resource blocks of the femtocell base station available for downlink transmissions to mobile devices that are not part of the preferred group.

Also disclosed herein is a network device for use in a communications network comprising at least one macrocell base station and at least one femtocell base station, the network device comprising memory and a processor, the processor configured to control access of a mobile device to a femtocell base station by allowing access of the mobile device to the femtocell base station based on a femtocell-mobile device path loss for transmissions between the mobile device and the femtocell base station.

In one variation the network device comprises a femtocell base station and the processor is configured control access to the femtocell base station based on a comparison of the femtocell-mobile device path loss to a threshold value. In one embodiment, the femtocell base station is configured to receive data indicative of femtocell-mobile device pathloss of a mobile device from a macrocell base station which is serving the mobile device. The femtocell base station may be configured to allow a mobile device which is not part of a preferred group of mobile devices to access the femtocell base station as part of controlling access.

In addition, the network device may be part of a macrocell base station. The network device may be configured to receive resource information from a femtocell base station. The network device may comprise a gateway device which forms a gateway to the femtocell base station.

BRIEF DESCRIPTION OF THE DRAWINGS

Embodiments of the invention will now be described in detail, by way of example only, with reference to the following drawings, in which.

DETAILED DESCRIPTION OF THE PREFERRED EMBODIMENTS

Although the invention will be described below with reference to an LTE communication network and femtocell base stations or HeNBs, it will be appreciated that the invention is applicable to any type of second, third or subsequent generation network in which femtocell base stations (whether for home, business or public use), or their equivalents in those networks, can be deployed, such as WiMAX and WCDMA/HSPA. Moreover, although in the embodiments below the femtocell base stations and macrocell base stations use the same air interface (LTE), it will be appreciated that the invention can be used in a situation in which the macrocell and femtocell base stations use different air interface schemes (for example the macrocell base stations could use WCDMA while the femtocell base stations use LTE).

It will be noted that this application refers generally to allowing or denying a macro UE access to a femtocell or femtocell base station, but it will be appreciated by those skilled in the art that in practice this means allowing or rejecting the handover (or a request for the handover) of a UE from a macrocell base station to the femtocell base station. Thus, references herein to allowing or denying access to the femtocell base station should be understood accordingly.

Moreover, the application also refers to allowing or denying a visiting UE access to a femtocell or femtocell base station, and it will be appreciated by those skilled in the art that in practice this means retaining the visiting UE in the femtocell when further access is allowed and performing a handover of the visiting UE back to the macrocell base station when further access is denied.

Figure 1:
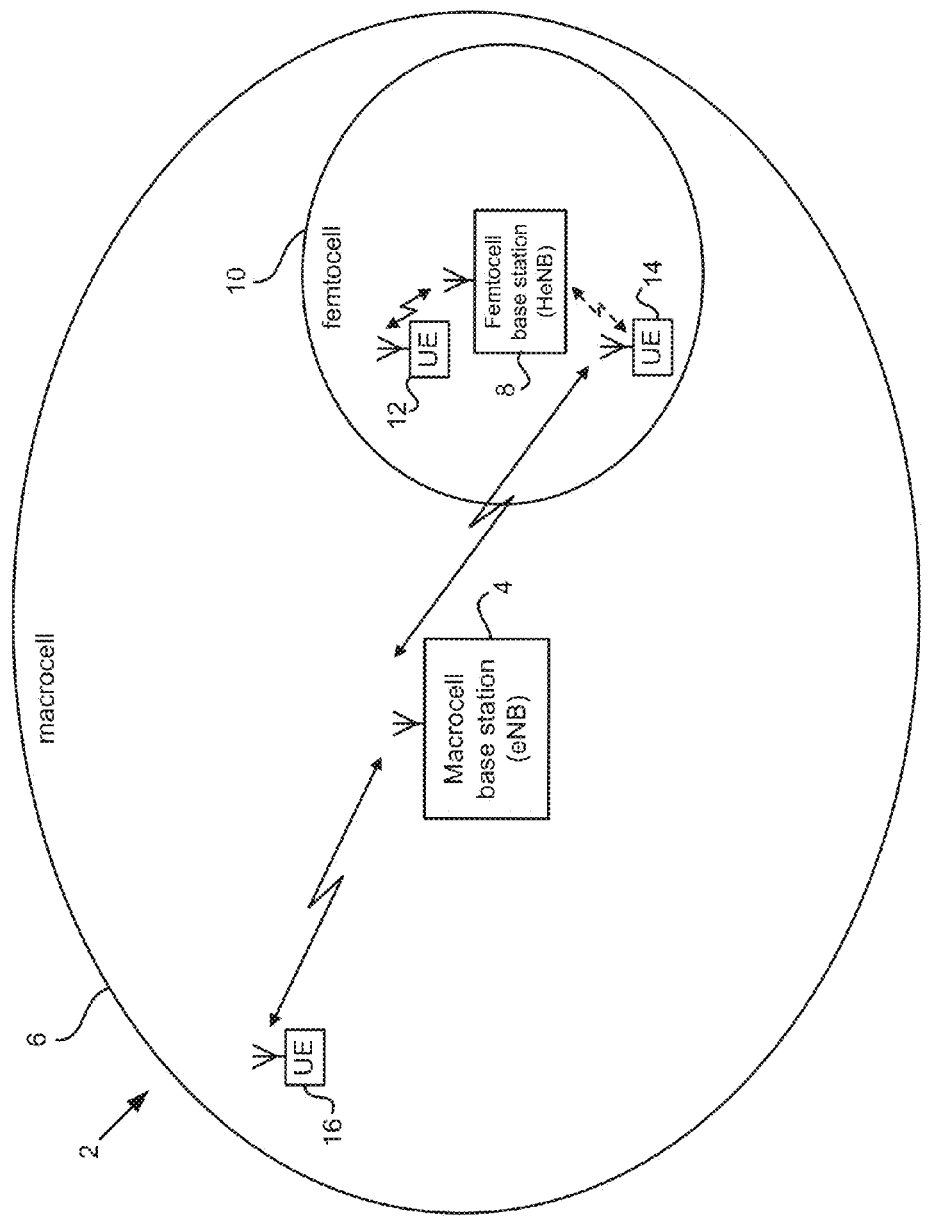
FIG. 1 shows an exemplary communication network.

FIG. 1 shows part of an exemplary communication network 2 in which the invention can be implemented. The communication network 2 includes a plurality of macrocell base stations 4 (only one of which is shown in FIG. 1) that each define a respective coverage area indicated by macrocell 6. In an LTE communication network, the macrocell base stations 4 are referred to as evolved Node Bs (eNBs).

One or more femtocell base stations 8 (Home eNBs—HeNBs) can be located within the coverage area 6 of the macrocell base station 4 (although only one femtocell base station 8 is shown in FIG. 1), with each femtocell base station 8 defining a respective coverage area indicated by femtocell 10. Femtocell base station 8 can operate in a hybrid access mode, which, as described above, means that home UEs (i.e. those UEs that belong to the Closed Subscriber Group of the femtocell base station) are given priority over visiting UEs.

It will be appreciated that FIG. 1 has not been drawn to scale, and that in most real-world implementations the coverage area 10 of the femtocell base station 8 will be significantly smaller than the coverage area 6 of the macrocell base station 4.

A number of mobile devices (UEs) 12, 14 and 16 are also located in the communication network 2 within the coverage area 6 of the macrocell base station 4.

Mobile device 12 is located within the coverage area 10 of the femtocell base station 8 and is a home UE since it is part of the Closed Subscriber Group of the femtocell base station 8. Mobile device 12 is currently associated with the femtocell base station 8, meaning that it transmits and/or receives control signalling and/or data using the femtocell base station 8.

Mobile devices 14 and 16 are each currently associated with the macrocell base station 4 (i.e. they are macro UEs), meaning that they transmit and/or receive control signalling and/or data using the macrocell base station 4. Mobile device 14 (at least) is not part of the Closed Subscriber Group of the femtocell base station 8, but it is within the coverage area 10, so it could potentially make use of the femtocell coverage 10 (i.e. it could become a visiting UE).

Figure 2:
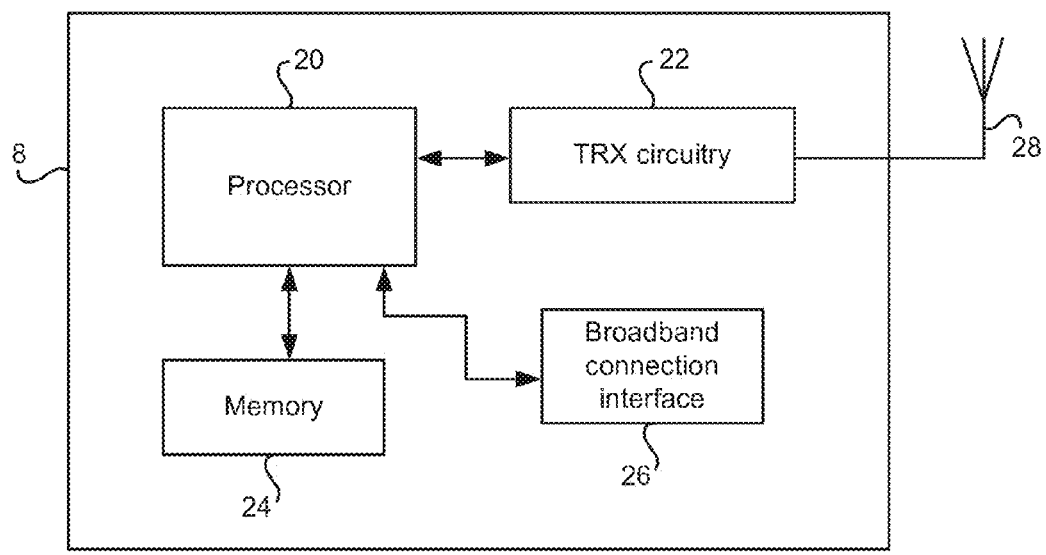
FIG. 2 is a block diagram of a femtocell base station in accordance with an aspect of the invention.

The femtocell base station 8 is illustrated in more detail in FIG. 2. The femtocell base station 8 comprises a processor 20 that controls the operation of the femtocell base station 8, transceiver circuitry 22, memory 24 and broadband connection interface 26 that are each connected to the processor 20, and an antenna 28 connected to the transceiver circuitry 22.

Figure 3:
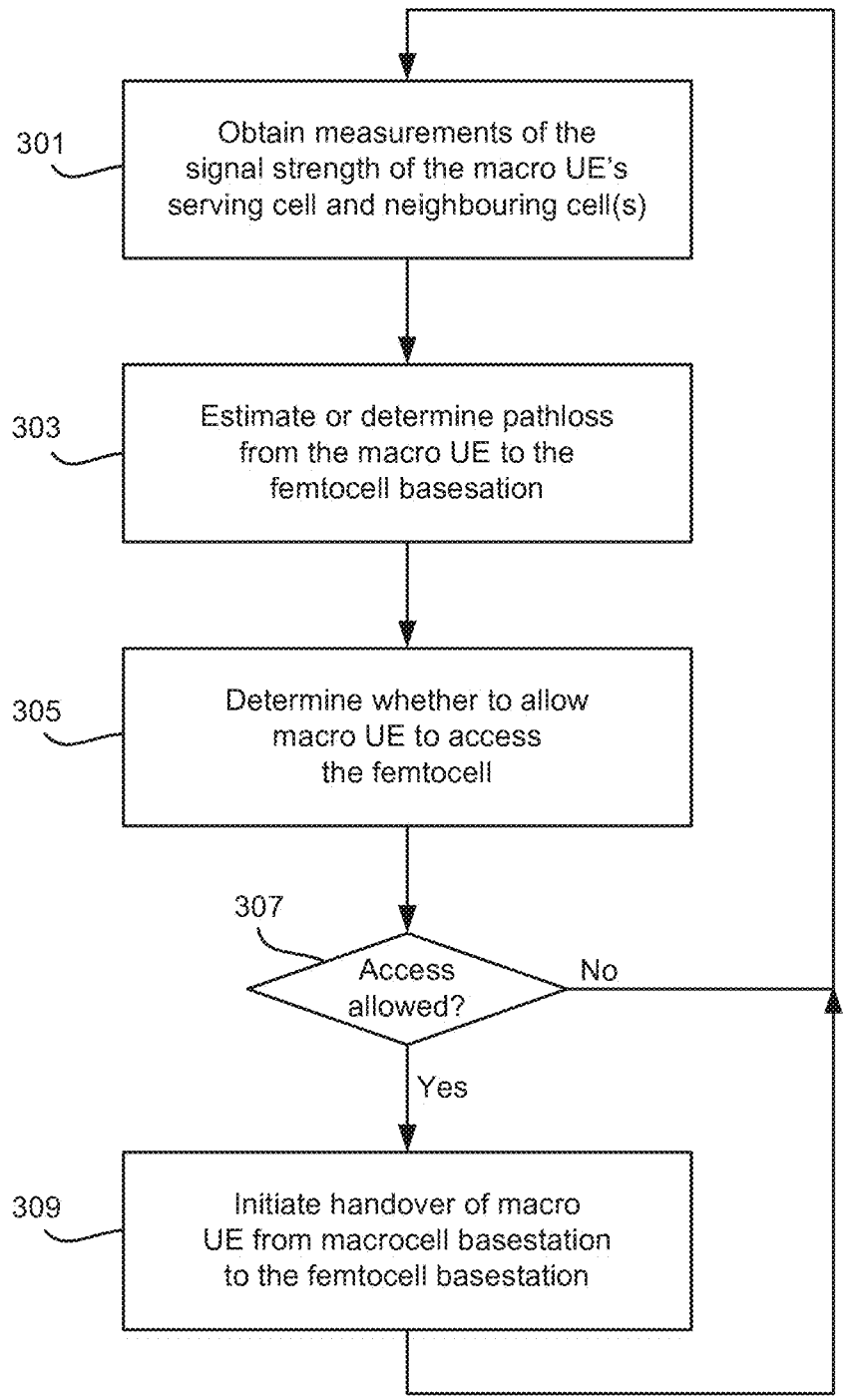
FIG. 3 is a flow chart illustrating a first method in accordance with the invention.

A method of determining whether to allow a macro UE 14 to access a femtocell 10 in accordance with the invention is shown in FIG. 3.

In step 301, measurements of the signal strength (RSRP) of the macro UE's serving cell (the macrocell 6) and neighbouring cell(s) (which will include the femtocell 10) are obtained.

In step 303, the pathloss from the macro UE 14 to the femtocell base station 8, denoted $P_{UE\_f}$, is estimated or determined from the measurements of the signal strength obtained in step 301 together with knowledge of the transmit power of the femtocell base station. The estimation of pathloss from signal strength measurements is known in the art and will not be described in further detail herein.

Then, in step 305, the estimated or determined pathloss from the macro UE 14 to the femtocell base station 8, $P_{UE\_f}$, is used to determine whether to allow the macro UE 14 to access the femtocell 10.

In a first implementation, step 305 comprises comparing the estimated or determined pathloss $P_{UE\_f}$ to a threshold value $\Phi$ dB. Access to the femtocell 10 can be allowed if the estimated or determined pathloss is below the threshold value (in one embodiment suitable values for the threshold $\Phi$ are in the range 60 to 80 dB inclusive). Thus, access can be permitted if $$P_{UE\_f} < \Phi \quad (1)$$

In a second implementation, step 305 comprises estimating or determining the pathloss from the macro UE 14 to the current serving macrocell base station 4, denoted $P_{UE\_m}$, and comparing this pathloss to the estimated or determined pathloss from the macro UE 14 to the femtocell base station 8, $P_{UE\_f}$. Access to the femtocell 10 can be allowed if the pathloss $P_{UE\_f}$ is lower than the pathloss $P_{UE\_m}$ by a configurable amount $\Delta$ dB (in one embodiment suitable values for the configurable amount $\Delta$ are in the range 20 to 30 dB inclusive). Thus, access can be permitted if $$P_{UE\_m} - P_{UE\_f} \geq \Delta \quad (2)$$

In a third implementation, step 305 comprises a combination of the conditions in the first and second implementations described above, and access can only be permitted if the conditions in both equations (1) and (2) are satisfied.

In further implementations, additional conditions to those specified in equations (1) and (2) can be applied to determine if the macro UE 14 can access the femtocell 10, with access being allowed only if all of the conditions are satisfied.

One additional condition specifies a limit to the number of visiting UEs such that access to the femtocell 10 can only be allowed if there are currently less than N other visiting UEs in the femtocell 10, where N is an integer equal to or greater than 1.

Another additional condition specifies that access to the femtocell 10 can only be allowed if the femtocell base station 8 has the available capacity or resources to support a visiting UE.

These additional conditions can be implemented by, for example, a femtocell base station 8 having separate limits on the number of CSG and visiting UEs that can be supported. Alternatively, if a the femtocell base station 8 is already highly loaded, it is possible to allow CSG UEs to access the femtocell base station 8 (although this might result in the overall quality of service for the other home UEs 12 being reduced), but access for macro UEs 14 would be denied.

As mentioned, if a macro UE meets the pathloss conditions specified above but the femtocell base station is currently supporting the maximum number of visiting UEs and/or does not have the resources to serve an additional visiting UE then access to that macro UE may be denied. In another implementation however in such a scenario the relevant macro UE and the existing visiting UEs may all be viewed as candidate visiting UEs and a selection made as to which of the candidate UEs will be allowed access or continued access to the femtocell. The selection criteria may be such that the UEs that would be best served by the femtocell and/or have the most significant pathloss to the macrocell are selected to be visiting UEs. For example the selection could be based on admitting the candidate UEs with the lowest pathlosses to the femtocell base station. In such an embodiment therefore continuing access to a visiting UE may be denied to allow an existing macro UE, that would be better served, to access the femtocell base station.

Returning to FIG. 3, if access to the femtocell 10 is allowed (step 307), the handover of the macro UE 14 from the macrocell 6 to the femtocell 10 is initiated and the macro UE 14 becomes a visiting UE (step 309). The method then returns to step 301 and repeats when the next measurements of the signal strength are obtained.

However, if access to the femtocell 10 is not allowed (step 307), the macro UE 14 continues its use of the macrocell 6 and the method returns to step 301 and repeats when the next measurements of the signal strength are obtained.

It will be appreciated that where a macro UE 14 is granted (allowed) access to a femtocell 10, it is necessary to periodically or regularly repeat the access control procedure to make sure that it is still beneficial for the macro UE 14 (visiting UE) to use the femtocell 10. The access control procedure can be repeated in accordance with the frequency of measurement reports or measurement events made by the macro UE 14, and/or depending on how the loading of the femtocell base station 8 (i.e. the number of CSG-UEs making use of the femtocell base station 8) changes over time.

Figure 4:
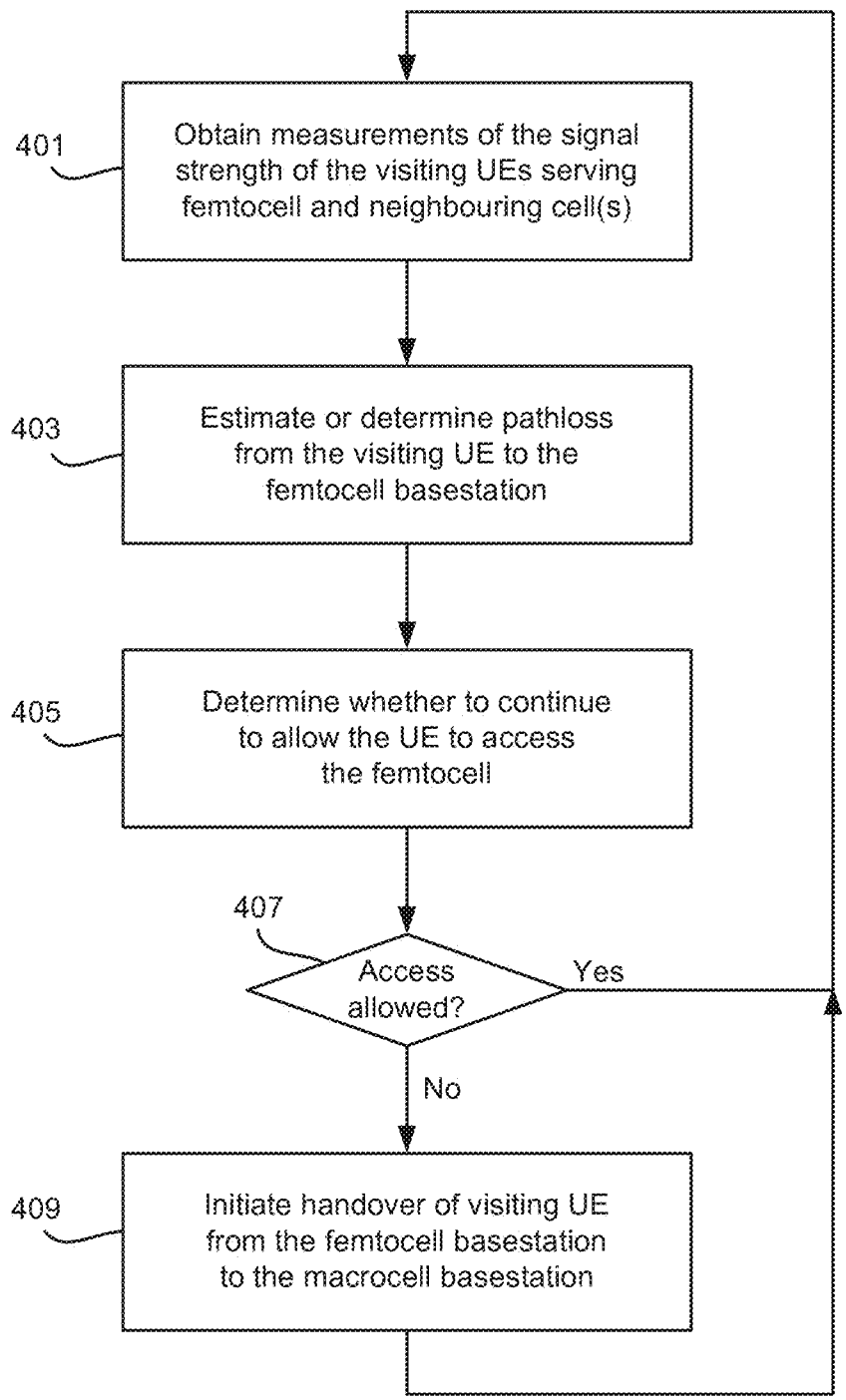
FIG. 4 is a flow chart illustrating a second method in accordance with the invention.

FIG. 4 illustrates a method corresponding to that shown in FIG. 3 for determining whether to allow a visiting UE 14 to continue to access a femtocell 10.

Thus, in step 401, measurements of the signal strength of the visiting UE's serving cell (the femtocell 10) and neighbouring cell(s) (which will include the macrocell 6) are obtained.

In step 403, the pathloss from the visiting UE 14 to the femtocell base station 8, denoted $P_{UE\_f}$, is estimated or determined from the measurements of the signal strength obtained in step 301 and knowledge of transmit powers. As mentioned above, the estimation of pathloss from signal strength measurements is known in the art and will not be described in further detail herein.

Then, in step 405, the estimated or determined pathloss from the visiting UE 14 to the femtocell base station 8, $P_{UE\_f}$, is used to determine whether to allow the visiting UE 14 to continue to access the femtocell 10. Step 405 can be implemented in the same ways as step 305 described above.

If access is allowed, the visiting UE 14 can continue using the femtocell 10 (step 407) and the method returns to step 401 and repeats when the next measurements of the signal strength are obtained.

However, the access is no longer allowed (step 407), handover of the visiting UE 14 from the femtocell 10 to the macrocell 6 is initiated and the visiting UE 14 returns to being a macro UE (step 409). The method then returns to step 401 and repeats when the next measurements of the signal strength are obtained.

It will be noted that both of the methods described above make use of the pathloss from the macro UE 14 to the femtocell base station 8 in order to determine whether the macro UE 14 can access the femtocell 10. However, in a preferred implementation of the invention, the overall loss in the link can be used, with the overall loss including the shadowing and antenna gains in addition to the pathloss.

The method described above to decide whether to allow a macro UE to access a femtocell may be implemented by the femtocell, i.e. the femtocell may make the decision whether or not to allow access of a macro UE and/or maintain access of a visiting UE. Alternatively at least an initial decision may be made by the macrocell base station. In general the method may be implemented by any suitable network node, i.e. any device that forms part of, or can communicate with, the network, provided that the estimation or determination of the relevant transmission loss or losses are available. This may involve passing information related to power measurements and transmit powers to the network node making the decision. Where the femtocell itself does not make the decision it may provide information about its available resources and utilization and any constraints thereon to the network node making the decision. In some implementations however a network node other than the femtocell may decide that a macro UE should be allowed access to a femtocell but the femtocell itself may subsequently refuse such access based on resource constraints.

Figure 5:
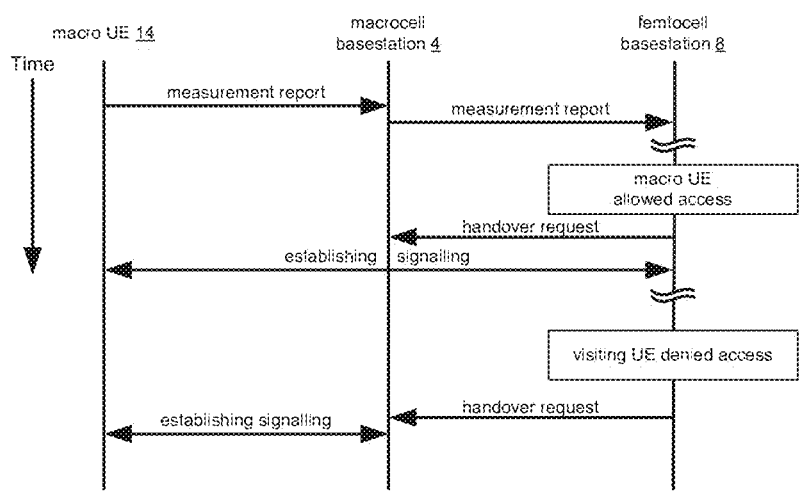
FIG. 5 is a signalling diagram illustrating a first embodiment according to the invention.

FIG. 5 is a signalling diagram illustrating an embodiment where the femtocell base station 8 decides whether to admit or maintain a visiting UE. FIG. 5 illustrates the signals exchanged between various elements of the network. A macro UE 14, being served by a macrocell base station 4, transmits a measurement report to the serving macrocell base station 4 of the signal strengths of the macro UE's serving cell and neighbouring cells. The macrocell base station 4 subsequently communicates with the femtocell base station 8 via a suitable network communication, such as an X2 interface, to provide the femtocell base station with data based on the measured signals strengths. In one embodiment the macrocell base station may provide the signal strength data to the femtocell base station 8 such that the femtocell can determine the pathloss from the femtocell to the macro UE. The femtocell base station 14 then implements a method as described above and decides whether or not to allow the macro UE access. When a measure of the pathloss from the macrocell base station to the macro UE is also used in making the access decision the macrocell may determine such pathloss and transmit it to the femtocell basestation. Alternatively the macrocell base station may supply the signal strength data to femtocell base station and the femtocell may determine or estimate the relevant pathlosses. The macrocell base station may provide the femtocell with an indication of the transmit power of the macrocell base station or the femtocell base station may determine the transmit power through detecting information broadcasts from the macrocell base station.

In the event that the pathloss indicates that the macro UE 14 should continue to be served by the macrocell, or the femtocell base station 8 is unable to accommodate any additional visiting UEs, the process may end and the macro UE 14 will continue to be served via the macrocell base station 4, in this case the femtocell may send an access denied message to the macrocell (not shown in FIG. 5). However, in the event that the femtocell base station 8 decides to allow access, a handover request to the macrocell base station 4 is generated and the femtocell base station 8 subsequently establishes signalling with the macro UE, which becomes a visiting UE of the femtocell base station.

Once the UE is established as a visiting UE it will, in future, transmit measurement reports directly to the femtocell base station. If subsequently the pathloss conditions change the femtocell base station 8 may determine that the visiting UE should be handed back to the macrocell base station. Also, if the resource conditions for the femtocell base station 8 change, for instance due to more home UEs accessing the femtocell, it may be necessary to deny the visiting UE continued access. At this point a handover request is generated for the macrocell base station and the visiting UE establishes signalling with the macrocell base station 4 and returns to being a macro UE (shown in the lower part of FIG. 5).

Figure 6:
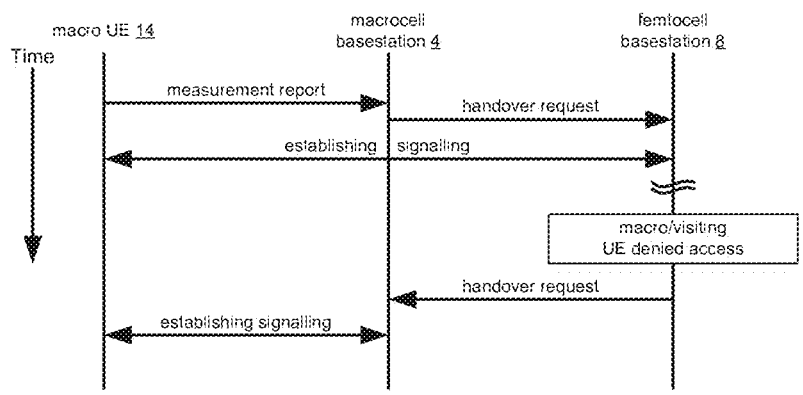
FIG. 6 is a signalling diagram illustrating a second embodiment according to the invention.

In an alternative implementation, illustrated with reference to FIG. 6, the femtocell may make the decision as to whether allow access by a macro UE but may establish temporary communications directly with such a macro UE as part of the decision making process. In this implementation a macro UE 14 will transmit a measurement report to the macrocell base station 4 as described above. In response to such a report the macrocell base station 4 may generate a handover request to any suitable femtocell base station 8. The macrocell base station 4 may be arranged to generate a handover request any time that the macro UE reports that a suitable femtocell base station may be available. The criteria used by the macrocell base station 4 to determine whether a femtocell is suitable may comprise simple signal strength measures rather than any pathloss considerations although various criteria could be used by the macrocell base station 4 to determine when to generate a handover request. The femtocell base station 8 then establishes signalling with the macro UE and receives a measurement report from the UE regarding signal strengths. At this point the femtocell base station 8 applies the method described above to decide whether the UE should be maintained as a visiting UE or not. Again a measure of the macrocell base station transmit power (if required to determine the macrocell-UE pathloss) may be communicated from the macrocell base station to the femtocell base station or determined from information broadcasts from the macrocell base station. If the femtocell decides to admit the UE as a visiting UE then the signalling is continued. However if the pathloss considerations and/or resource constraints on the femtocell base station 8 indicate that the UE should be denied access then the femtocell base station 8 generates a handover request to the macrocell base station 4 and hands the UE back. This also occurs when conditions change, such that a visiting UE is denied continuing access.

Figure 7:
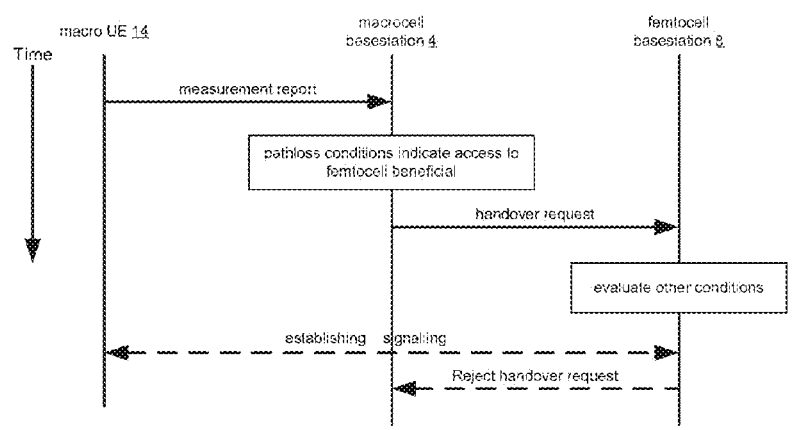
FIG. 7 is a signalling diagram illustrating a third embodiment according to the invention.

FIG. 7 illustrates an implementation in which the macrocell base station 4 makes a determination as to whether a macro UE should access a femtocell 8 based on pathloss considerations but wherein the femtocell may allow or refuse such access based on resource considerations. As shown in FIG. 7 a macro UE 14 transmits a measurement report to the serving macrocell base station 4 which applies the pathloss considerations of the method described above to decide whether the macro UE 14 should access a suitable femtocell base station 8. The macrocell base station either has knowledge of, or receives an indication of, the transmit power of the femtocell base station.

In the event that the pathloss considerations indicate that access to a femtocell would be beneficial a handover request to the femtocell base station 8 is generated. The femtocell base station may, if resources permit, establish signalling with the macro UE 14 and admit it as a visiting UE. If resource constraints on the femtocell base station 8 mean that it can not admit any new visiting UEs then the femtocell base station may reject the handover request. Alternatively the femtocell base station 8 may, following a handover request, establish signalling with the macro UE but then hand it back to the macrocell due to resource constraints.

The macrocell base station may also be arranged to make access decisions regarding visiting UEs, i.e. to determine whether a UE should be maintained as a visiting UE and thus may receive signal strength/transmit power or pathloss data from the femtocell base station for visiting UEs. In another embodiment however the macrocell base station makes the access decision as to when to seek to hand over a macro UE to a femtocell base station but the femtocell base station then makes the access decision whether to maintain access for a visiting UE.

Figure 8:
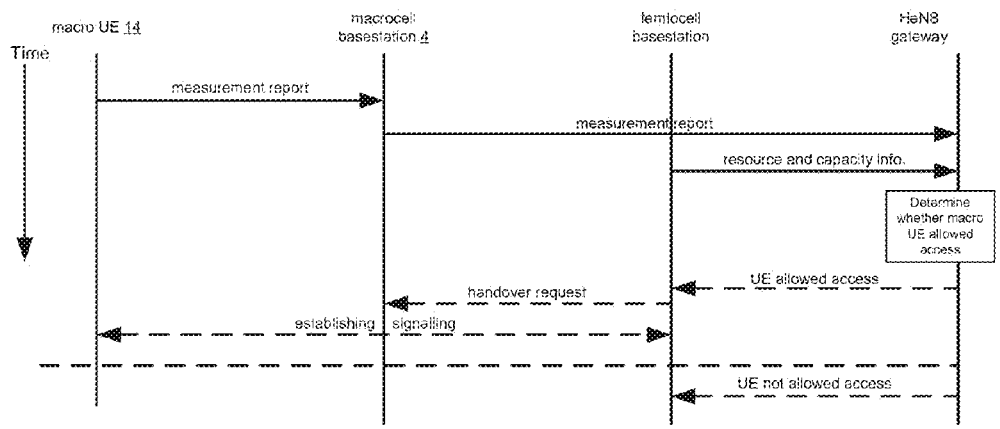
FIG. 8 is a signalling diagram illustrating a fourth embodiment according to the invention.

FIG. 8 illustrates an implementation in which another network node, in this example a HeNB gateway, makes the access decisions. In this implementation a macro UE 14 transmits measurement reports to the macrocell base station 4 which are then communicated to the HeNB gateway via any suitable communication interface. The femtocell base station 8 also communicates with the HeNB gateway and provides information about the resources and capacity of the femtocell. Transmit powers from both the macrocell and the femtocell are also provided to the HeNB Gateway. The HeNB gateway receives all the information and makes a decision as to whether the macro UE should be allowed access to the femtocell. At any point that a decision is made to admit the macro UE 14 to access the femtocell the HeNB gateway will transmit the decision to the femtocell base station, although in another implementation the access decision could additionally or alternatively be communicated to the macrocell base station 4. The femtocell base station 8 then generates a handover request to the macrocell base station 4 and subsequent establishes signalling with the UE to admit it as a visiting UE.

Were the HeNB gateway to have determined that access should not be allowed to a macro UE then no action is necessary although the decision to deny access may be communicated to the femtocell (and/or the macrocell base station).

For a visiting UE the femtocell base station 8 may provide signal data and resource information to the HeNB gateway for a decision as to whether to continue to allow access. In the event that conditions change and further access should be denied the HeNB gateway may indicate such a decision to the femtocell (and/or the macrocell base station) which may then generate a handover request to hand the visiting UE back to the macrocell base station 4. Alternatively, the HeNB gateway may make an access decision for when a macro UE should become a visiting UE but the femtocell base station itself may make access decisions for any visiting UEs that have previously been admitted.

In accordance with a further aspect of the invention, once a macro UE 14 has been allowed to access a femtocell 10, one or more constraints are placed on the use of resources by the visiting UE in order to reduce the impact of the visiting UE on the home UE(s) 12.

A first constraint that can be applied is a restriction on the number of frequency Resource Blocks (RBs) to N. that can be used in the uplink from the visiting UE 14 to the femtocell base station 8. A suitable range of values would be 5 to 20 for a 10 MHz LTE system.

Another constraint that can be applied relates to the "power cap" for uplink transmissions that is used to protect other macro UEs 16 in the macrocell 6 that are in the vicinity of the femtocell 10. According to this constraint, the power cap is set higher for visiting UEs 14 than for home UEs 12 by $\Omega$ dB. A suitable range of values for $\Omega$ is 10 to 20 dB. Thus, visiting UEs 14 are permitted to use a higher power for transmitting signals to the femtocell base station 8 than home UEs 12. Typically, in use, the home UEs that are accessing the femtocell may be located closer to the femtocell base station than any visiting UEs, for example were the femtocell base station located in a house the home UEs may typically be located within the house when accessing the femtocell whereas any visiting UEs may be outside. The visiting UEs may therefore require more power than the home UEs to access the femtocell and thus may be more sensitive to a power cap. Therefore allowing the visiting UEs a higher power cap than the home UEs allows the visiting UEs to access the femtocell from further away—which benefits the network as a whole.

Another constraint can be applied to the downlink transmissions from the femtocell base station 8 to the visiting UE 14 such that up to X % of the transmission power and Y % RBs are used by visiting UEs 14. Typically the transmission power per resource block is constant and hence the values of X and Y are typically the same but in some embodiments the power per resource block may vary for visiting UEs and home UEs. This constraint could be applied so that a limit applies individually to each visiting UE or the constraint could be applied so as to collectively limit the available resource blocks and transmission power shared by all the visiting UEs. In one embodiment the maximum percentage X of the transmission power used collectively by the visiting UEs is in the range of 25 to 50% and the maximum percentage Y of the RBs used collectively by the visiting UEs is also in the range of 25 to 50%.

The above embodiments have been described with reference to femtocell base stations operating in hybrid access mode. As will be described in more detail below operating a femtocell base station (that has a closed subscriber group) in hybrid access mode according to embodiments of the present invention offers benefits for the network as a whole compared with operating such a femtocell in closed mode. However the same methods may also be applied to determining when macro UEs should access an open access femtocell base station, although in such case it will not be necessary to implement resource limitations to ensure preferential access for home UEs.

FIGS. 9 to 16 illustrate the performance benefits of the hybrid mode access technique according to the invention over the conventional closed mode of operation. The graphs in FIGS. 9 to 16 were generated using the Femto Forum OFDMA/3GPP RAN4 evaluation methodology, for the suburban deployment scenario where houses having femtocell base stations are randomly dropped within a macrocell coverage area. A 10 MHz LTE system is assumed. Macro UEs may be dropped into houses having femtocell base stations. Home UEs are allowed outdoors (10% are outdoors).

Each graph in FIGS. 9 to 16 represents a particular scenario and shows the performance in a closed mode of operation and in the hybrid mode according to the invention.

In the downlink, simulation results are generated both with and without femtocell "power setting" (i.e. with some control of the maximum permitted transmission power of the femtocell base station). If femtocell power setting is present, then the femtocell base station is assumed to control its power based on the received power from a macrocell base station.

In the uplink, a static capping of home UE power is performed for both closed and hybrid access. This static capping is based on pathloss measurements to the macrocell base station.

The results shown in FIGS. 9 to 16 are generated based on the second implementation of step 305 described above (i.e. that access to the femtocell 10 can be allowed if the pathloss $P_{UE\_f}$ is lower than the pathloss $P_{UE\_m}$ by a configurable amount Δ dB) with the following settings (which have been determined empirically as a trade-off between uplink and downlink performance and as a trade-off between macro UE and home UE performance):

Δ=30 dB

Uplink maximum $N_{max}$=9 (out of 50) RBs are used by visiting UEs

The uplink "power cap" to protect the macrocell is 15 dB higher for visiting UEs than for home UEs (i.e. Ω=15)

Downlink: up to X=50% power and Y=50% RBs used by visiting UEs.

Figure 9:
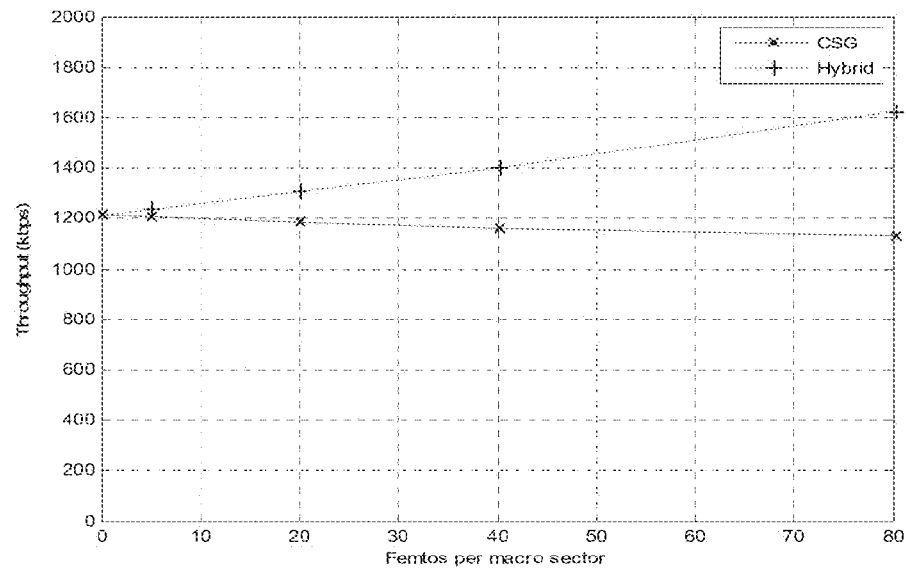
FIGS. 9 to 16 illustrate the performance benefits of the hybrid mode access technique according to the invention over the conventional closed mode of operation.

FIG. 9 illustrates how the data throughput on an uplink from macro UEs (including those UEs visiting the femtocell in the case of hybrid access) to a macrocell base station is affected by an increasing number of active femtocell base stations within the coverage area of the macrocell base station for both a closed access scheme (CSG) and the hybrid access scheme according to the invention. In particular, it can be seen that while the throughput in a closed access scheme remains relatively constant regardless of the femtocell density, the throughput using the hybrid scheme is always better than the closed scheme and in fact the throughput improves with increasing femtocell density.

Figure 10:
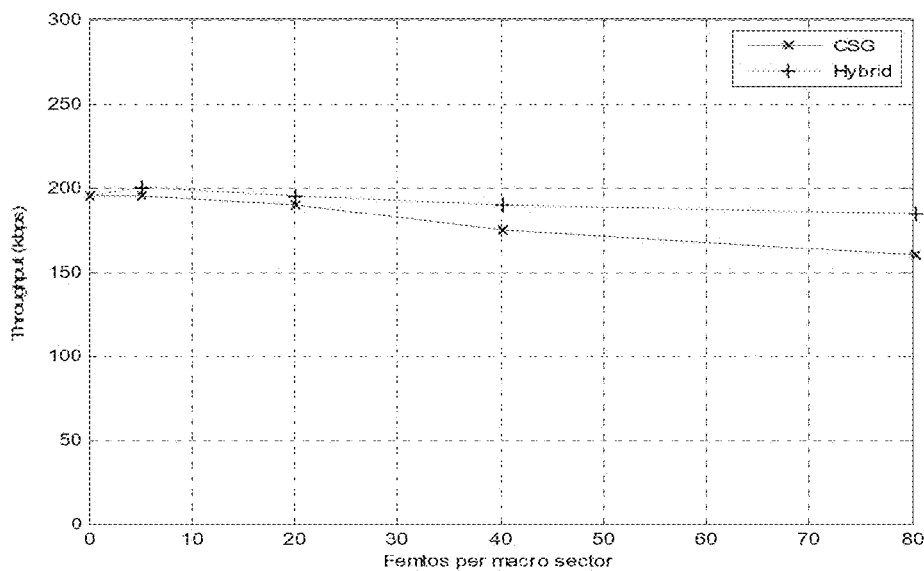

FIG. 10 illustrates how the data throughput on an uplink from cell edge (5 percentile) macro UEs (again including those UEs visiting the femtocell in the case of hybrid access) to a macrocell base station is affected by an increasing number of active femtocell base stations within the coverage area of the macrocell base station. It can again be seen that the hybrid access scheme provides better throughput at nearly all femtocell densities (the throughput being approximately the same at densities of less than 10 femtocell base stations per macro sector).

Figure 11:
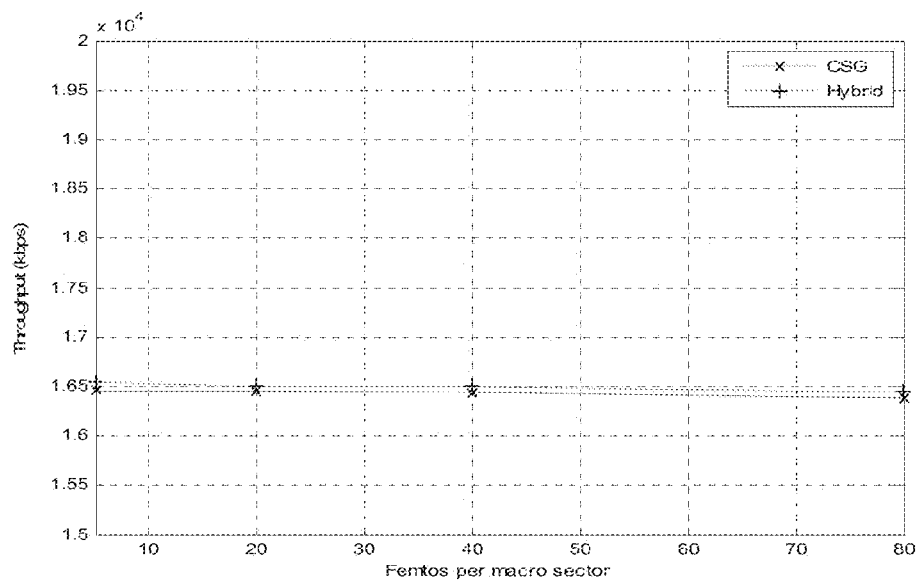

FIG. 11 shows how the data throughput on an uplink from the home UEs to their femtocell base stations is affected by an increasing number of active femtocell base stations. It can be seen that the data throughput under both the closed and hybrid schemes remains approximately the same regardless of the femtocell density, although the data throughput under the hybrid scheme is marginally better than under the closed scheme.

Figure 12:
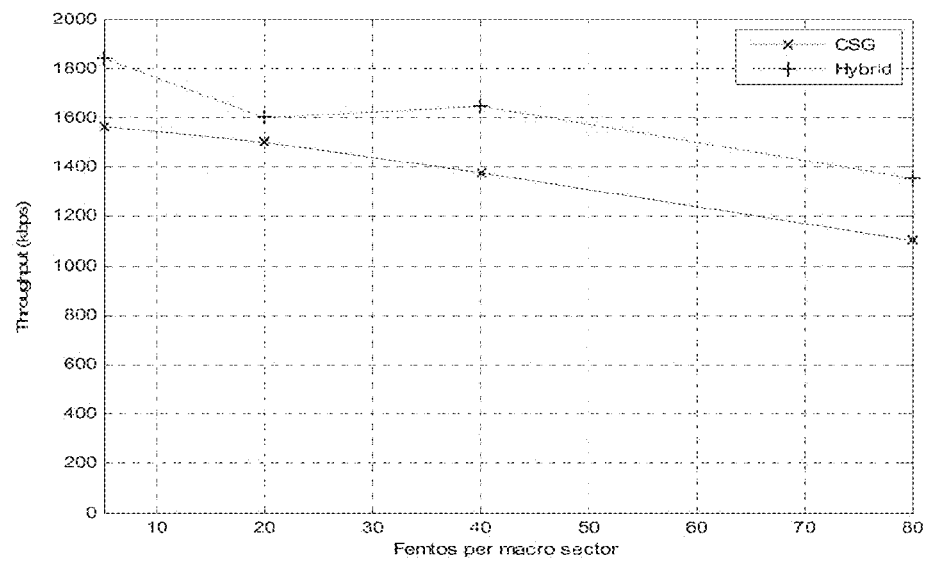

FIG. 12 shows how the data throughput on an uplink from cell edge (5 percentile) home UEs to their femtocell base stations is affected by an increasing number of active femtocell base stations. It can be seen that the data throughput under both the closed and hybrid schemes decrease approximately linearly with increasing femtocell density, although the data throughput for the hybrid scheme is approximately 200 kbps better at most femtocell densities.

Figure 13:
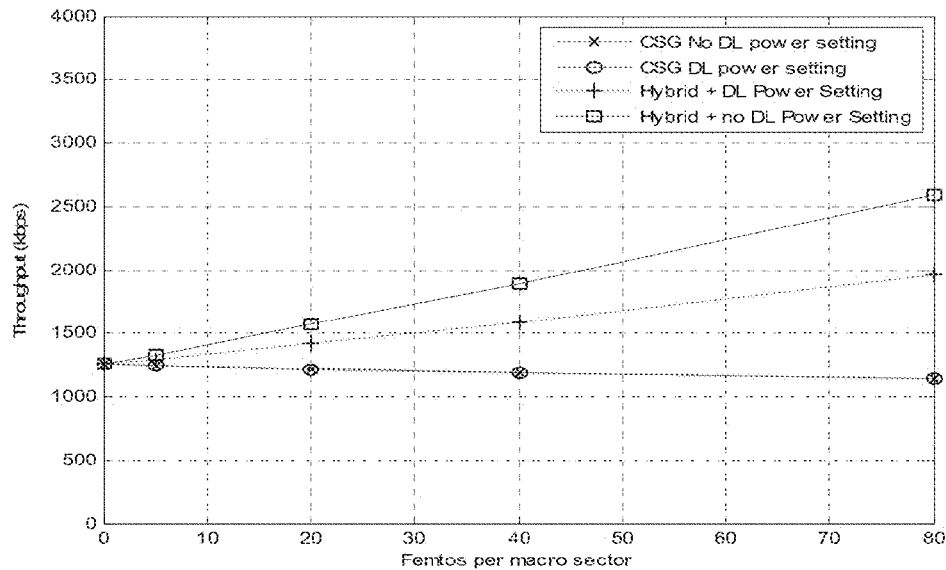

FIG. 13 shows how the data throughput on a downlink from the macrocell base station to macro UEs (including those UEs visiting the femtocell in the case of hybrid access) is affected by an increasing number of active femtocell base stations for both a closed access scheme (CSG) and the hybrid access scheme, each scheme being evaluated with and without downlink power setting. It can be seen that the data throughput under the closed scheme is relatively constant for all femtocell densities both with and without downlink power setting, whereas the data throughput under the hybrid scheme is always better than the closed scheme and in fact improves with increasing femtocell density (the hybrid scheme without power setting providing the best data throughput).

Figure 14:
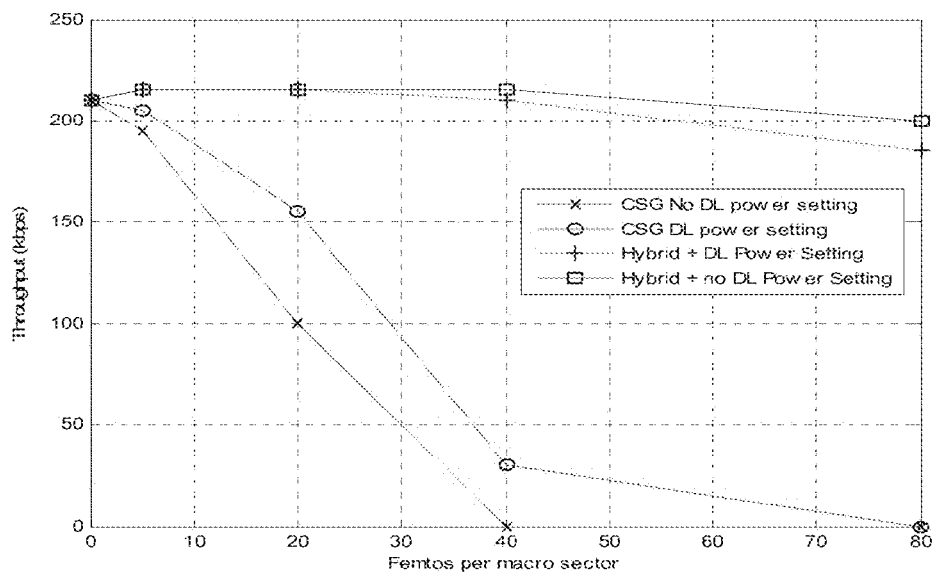

FIG. 14 shows how the data throughput on a downlink from the macrocell base station to cell edge (5 percentile) macro UEs (including those UEs visiting the femtocell in the case of hybrid access) is affected by an increasing number of active femtocell base stations for both a closed scheme and the hybrid scheme, each scheme being evaluated with and without downlink power setting. It can be seen that the data throughput under the closed scheme rapidly falls off to zero with increasing femtocell density, regardless of whether power setting is used. However, the data throughput under the hybrid scheme provides a data throughput that only gradually decreases with increasing femtocell density, and thus the hybrid scheme provides a very significant improvement over the closed scheme in this case.

Figure 15:
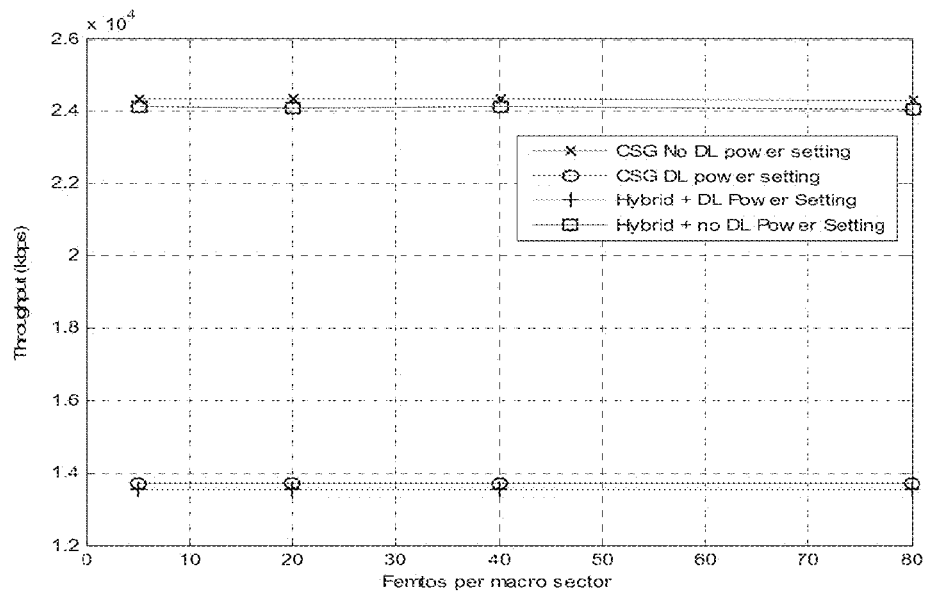

FIG. 15 shows how the data throughput on a downlink from the femtocell base station to home UEs is affected by an increasing number of active femtocell base stations for both a closed scheme and the hybrid scheme, each scheme being evaluated with and without downlink power setting. It can be seen that the use of power setting significantly reduces the data throughput under either scheme (which is to be expected) but the hybrid scheme does not adversely affect the data throughput over the closed scheme in either the power setting or no power setting cases. This is significant since it shows that admitting macro UEs under the hybrid access scheme will not substantially affect the data throughput for home UEs.

Figure 16:
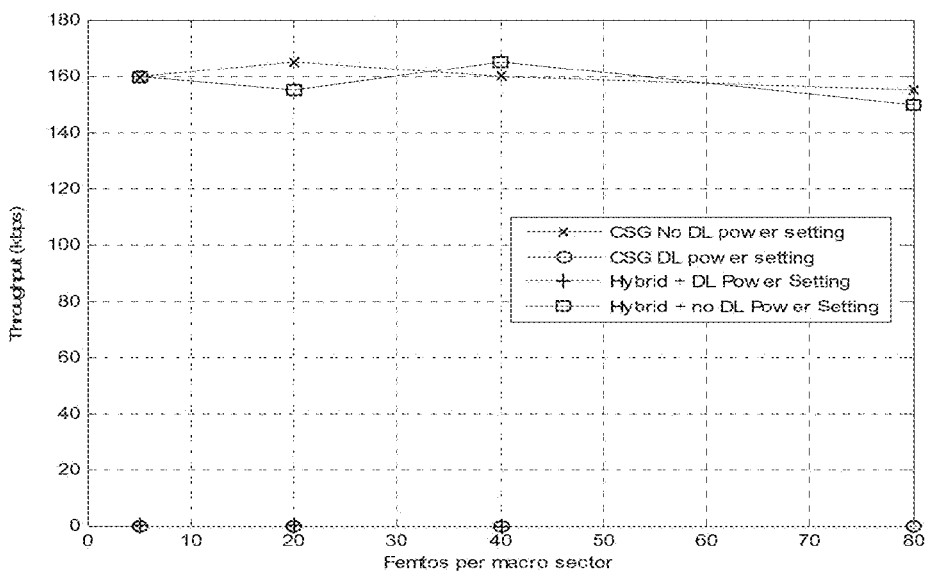

FIG. 16 shows how the data throughput on a downlink from the femtocell base station to cell edge (5 percentile) home UEs is affected by an increasing number of active femtocell base stations for both a closed scheme and the hybrid scheme, each scheme being evaluated with and without downlink power setting. As with FIG. 15, it can be seen that the use of power setting under either scheme has a significant impact on the data throughput (although in this case the data throughput is approximately zero when power setting is used), but the hybrid scheme again does not adversely affect the data throughput over the closed scheme in either the power setting or no power setting cases. Again, this shows that admitting macro UEs under the hybrid access scheme does not substantially affect the data throughput for home UEs.

Although the graphs in FIGS. 9 to 16 demonstrate the performance of the second implementation of step 305 described above, similar results are obtained with the first and third implementations of step 305.

Thus, with the appropriate strategy for deciding when to admit macro UEs to femtocells, and optionally with the appropriate control of the usage of power and RBs by visiting UEs in the femtocell, implementing hybrid access control according to the invention offers performance benefits in both the uplink and downlink for macro UEs, with similar or slightly improved performance for home UEs. The performance benefits for macro UEs are particularly pronounced in the downlink for cell edge macro UEs. With the hybrid access control according to the invention, no other downlink interference mitigation approach (e.g. power setting) is required.

There is therefore provided an improved method and network node implementing the same for determining when to allow a macro UE to access a femtocell base station operating in a hybrid access mode that considers both uplink and downlink performance.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any element described herein may combined with any other element described herein, in any combination. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method for controlling access of a mobile device to a femtocell base station comprising:
   determining whether to allow access of the mobile device to the femtocell base station based on a femtocell-mobile device pathloss for transmissions between the mobile device and the femtocell base station;
   applying one or more constraints governing transmission with a mobile device that is not part of a preferred group of mobile devices for the femtocell base station, when access to the femtoceil base station is allowed to the mobile device which is not part of the preferred group of mobile devices,
   wherein the one or more constraints comprises a power cap on the power of uplink transmission from the mobile device to the femtocell base station, and
   wherein the power cap for the mobile device which is not part of the preferred group is higher than a power cap for other mobile devices that are part of the preferred group.

2. The method as claimed in claim 1 further comprising obtaining measurement data of signal strength of the femtocell base station at the mobile device and assessing the femtocell-mobile device pathloss from the measurement data.

3. The method as claimed in claim 1 wherein determining whether to allow access comprises allowing access only if the femtocell-mobile device pathloss is below a threshold value.

4. The method as claimed in claim 1 further comprising allowing access only if at least one additional condition is satisfied.

5. The method as claimed in claim 4 wherein at least one of the one additional condition specifies that access to the femtocell base station for the mobile device is allowed only if the number of mobile devices which are not part of the preferred group of mobile devices that are accessing the femtocell base station is less than a specified limit.

6. The method as claimed in claim 5 wherein the specified limit varies depending on the number of mobile devices that are part of the preferred group of mobile devices that are accessing the femtocell base station.

7. The method as claimed in claim 4 wherein at least one of the one additional condition specifies that access to the femtocell base station is allowed only if the femtocell base station has the available capacity or resources to support the mobile device.

8. The method as claimed in claim 1 further comprising, when the mobile device is being served by a macrocell base station and access to the femtocell base station is allowed, initiating handover of the mobile device from the macrocell base station to the femtocell base station.

9. The method as claimed in claim 1 wherein, if access to the femtocell base station is allowed to the mobile device, then determining whether to allow access is repeated to determine whether continued access should be allowed to the mobile device.

10. The method as claimed in claim 9 wherein determining whether to allow access is repeated at at least one of: periodic intervals; availability of updated pathloss data; and changes in loading conditions of the femtocell base station.

11. The method as claimed in claim 10 wherein determining whether to allow access is repeated following access to the femtocell of a mobile device which is part of the preferred group of mobile devices for the femtocell base station.

12. The method as claimed in claim 9 wherein, if in the event that access of the mobile device to the femtocell base station is denied, then further comprising initiating handover of the mobile device from the femtocell base cell to a macrocell base station.

13. The method as claimed in claim 1 wherein overall transmission losses between the femtocell and the mobile device are used as an indication of the femtocell-mobile device pathloss.

14. The method as claimed in claim 1 wherein one or more constraint comprises a restriction on the number of frequency resource blocks that can be used in the uplink from the mobile device which is not part of the preferred group to the femtocell base station.

15. The method as claimed in claim 1 where one constraint is a restriction on an amount of power of the femtocell base station transmissions available for downlink transmissions to mobile devices that are not part of the preferred group.

16. The method as claimed in claim 1 where one constraint is a restriction on an amount of resource blocks of the femtocell base station available for downlink transmissions to mobile devices that are not part of the preferred group.

17. The method as claimed in claim 1 wherein whether to allow access is further based on a macrocell-mobile device pathloss for transmissions between the mobile device and a macrocell base station.

18. The method as claimed in claim 17 comprising obtaining measurement data of the signal strength of at least one available macrocell base station at the mobile device and assessing the macrocell-mobile device pathloss from the measurement data.

19. The method as claimed in claim 17 wherein determining whether to allow access comprises allowing access only if the femtocell-mobile device pathloss is lower than the macrocell-mobile device pathloss.

20. The method as claimed in claim 19 wherein determining whether to allow access comprises allowing access only if the femtocell-mobile device pathloss is lower than the macrocell-mobile device pathloss by a threshold amount.

21. A network device for use in a communications network comprising at least one macrocell base station and at least one femtocell base station, the network device comprising memory and a processor, the processor configured to control access of a mobile device to a femtocell base station by allowing access of the mobile device to the femtocell base station based on a femtocell-mobile device pathloss for transmissions between the mobile device and the femtocell base station, wherein, when access to the femtocell base station is allowed to a mobile device that is not part of a preferred group of mobile devices for the femtocell base station, one or more constraints are applied governing transmission with the mobile device that is not part of the preferred group, wherein one constraint comprises a power cap on the power of uplink transmission from the mobile device to the femtocell base station, and the power cap for the mobile device that is not part of the preferred group is higher than a power cap for other mobile devices that are part of the preferred group.

22. The network device as claimed in claim 21 wherein the network device comprises a femotcell base station and the processor is configured control access to the femtocell base station based on a comparison of the femtocell-mobile device pathloss to a threshold value.

23. The network device as claimed in claim 22 wherein the femtocell base station is configured to receive data indicative of femtocell-mobile device pathloss of a mobile device from a macrocell base station which is serving the mobile device.

24. The network device as claimed in claim 22 wherein the femtocell base station is configured to allow a mobile device which is not part of the preferred group of mobile devices to access the femtocell base station as part of controlling access.

25. The network device as claimed in claim 21 wherein the network device comprises at least part of a macrocell base station.

26. The network device as claimed in claim 25 wherein the network device is configured to receive resource information from a femtocell base station.

27. The network device as claimed in claim 21 wherein the network device comprises a gateway device which forms a gateway to the femtocell base station.

* * * * *